(12) United States Patent
Smith et al.

(10) Patent No.: US 8,959,110 B2
(45) Date of Patent: Feb. 17, 2015

(54) DYNAMIC QUERY FOR EXTERNAL DATA CONNECTIONS

(75) Inventors: Michael Hopkins Smith, Seattle, WA (US); Shen Wang, Seattle, WA (US); David Jon Conger, Issaquah, WA (US); Gregory S. Lindhorst, Seattle, WA (US); Steven Miles Greenberg, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 598 days.

(21) Appl. No.: 13/235,487

(22) Filed: Sep. 18, 2011

(65) Prior Publication Data

US 2013/0073589 A1    Mar. 21, 2013

(51) Int. Cl.
*G06F 17/30*        (2006.01)

(52) U.S. Cl.
CPC .................. *G06F 17/30545* (2013.01)
USPC ........................................ 707/770; 707/796

(58) Field of Classification Search
USPC ................... 707/719, 769, 770, 796
See application file for complete search history.

(56) References Cited

U.S. PATENT DOCUMENTS

| | | | |
|---|---|---|---|
| 6,289,334 B1 | 9/2001 | Reiner et al. | |
| 6,643,640 B1 | 11/2003 | Getchius et al. | |
| 6,983,275 B2 | 1/2006 | Koo et al. | |
| 7,003,504 B1 * | 2/2006 | Angus et al. | 1/1 |
| 7,457,810 B2 | 11/2008 | Breining et al. | |
| 7,725,460 B2 | 5/2010 | Seitz et al. | |
| 2004/0117407 A1 * | 6/2004 | Kumar et al. | 707/200 |
| 2007/0130616 A1 | 6/2007 | Ng et al. | |
| 2008/0059449 A1 | 3/2008 | Webster et al. | |
| 2011/0131199 A1 * | 6/2011 | Simon et al. | 707/714 |

OTHER PUBLICATIONS

Khalefa, et al., "PrefJoin: An efficient preference-aware join operator", Retrieved at <<http://ieeexplore.ieee.org/stamp/stamp.jsp?tp=&arnumber=5767894>>, IEEE 27th International Conference on Data Engineering, Apr. 11-16, 2011, pp. 995-1006.

Levandoski, et al., "PermJoin: An Efficient Algorithm for Producing Early Results in Multi-join Query Plans", Retrieved at <<http://ieeexplore.ieee.org/stamp/stamp.jsp?tp=&arnumber=4497580>>, IEEE 24th International Conference on Data Engineering, Apr. 7-12, 2008, pp. 1433-1435.

(Continued)

*Primary Examiner* — Monica Pyo
(74) *Attorney, Agent, or Firm* — Damon Rieth; Jim Ross; Micky Minhas

(57) ABSTRACT

An application module generates a query that may involve retrieving data from a local data storage source or from an external data storage source. The application module retrieves metadata to form a query tree stored in the local data storage source and uses the query tree to ascertain one or more sub-queries necessary to complete the query and whether the necessary data for each sub-query is stored locally or externally. Based on the location of the data to complete a sub-query, the application module uses the services of an internal query processing layer if external data is involved for the sub-query. The application module uses the services of a query processing layer in the local data storage source if the data is local. Once all the sub-queries associated with the query tree are performed, then the overall query results are returned to the application module.

18 Claims, 6 Drawing Sheets

(56) References Cited

OTHER PUBLICATIONS

Hussey, Peter., "Designing Efficient Applications for Microsoft SQL Server", Retrieved at <<http://msdn.microsoft.com/en-us/library/aa226307(SQL.70).aspx>>, Aug. 1997, pp. 24.

"Optimizing MERGE Statement Performance", Retrieved at <<http://msdn.microsoft.com/en-us/library/cc879317.aspx>>, Retrieved Date: May 19, 2011, pp. 8.

* cited by examiner

DYNAMIC QUERY FOR EXTERNAL DATA CONNECTIONS

BACKGROUND

Users of information services are increasingly relying on cloud based processing systems for storing data. In the past, before data communication networks were commonly available, users were limited to only accessing data directly stored on their computer, or directly accessible by their computer. With the advent of local area networks, computers could access data stored on external servers. With the rise of the Internet, computers frequently access remote servers to obtain information, which in turn, may obtain data from other remote servers. Frequently, the data requested by a computer is no longer local to the computer initiating the request. Thus, data accessed by users is no longer tied to a particular personal computer, server, or computing platform.

In "cloud computing" not only will a user's data be stored on a number of remote servers, but so will be the user's applications. The particular server hosting the data and/or application for the user will likely be unknown by the user. Further, the user will likely not care how or where the application, and the data used by the application, will be stored.

For processing systems handling a large volume of information requests, the sheer volume of requests for data requires that processing systems access data in an efficient manner. The efficient design of searching, retrieving, and returning data is important for both providing timely results to the application making the request, but also for maximizing the processing capabilities of the computing infrastructure. This is particularly relevant to a cloud computing environment, where service providers may host a variety of applications requiring access to a broad spectrum of information by performing database queries.

It is with respect to these and other considerations that the disclosure made herein is presented.

SUMMARY

Concepts and technologies are described herein for a system to efficiently handle a database query based on dynamically processing metadata about the query to determine whether the data repositories needed to fulfill the request are local or external to the system. An application ascertains whether fulfillment of a query requires accessing only local data, external data, or a combination of both by using locally stored metadata. The metadata is used to create a query tree data structure indicating where the data necessary to complete the query is stored. If completing the query requires only accessing local data, then in one embodiment the application requests a local database system to perform the query using a local query processing layer in the local database and return the results to the application. If the application determines that completing the query requires accessing external data, then the application uses an internal query layer to retrieve the external data from an external database. In some embodiments, multiple sub-queries may be performed where the external data is processed in conjunction with local data in order to complete a response to the query.

In one embodiment, a system for processing a query request includes a local database, an external database, a memory, and an application server that includes a processor. The local database stores metadata and local data, along with a local database query processing layer configured to process sub-queries directed to the local database. The external database stores external data, and is configured to return external data in response to a sub-query to the external database. The memory is configured to store the metadata retrieved from the local database. Finally, the processor in the application server is configured to retrieve the metadata stored in the local database and ascertain at least one sub-query associated with a first data source location type. The processor then initiates the at least one sub-query that is a local query request to the local database, if the first data source location type is a local data type. The processor is also configured to initiate the at least one sub-query that is the external query request to the external database if the first data source location type is an external data type.

In another embodiment, a method for processing a query requests includes generating a query request at an application module in an application server, retrieving metadata from a local data store, wherein the metadata is associated with the query request. Then, the metadata is analyzed to derive a query tree data structure from the metadata to identify a first sub-query to be performed to fulfill the query request, wherein the first sub-query is directed to an external database. The query tree data structure is used to determine a first data source location type indicating an external data type, and the first sub-query request is initiated to a query processing layer in the application module to retrieve the external data. Finally, the query result is returned in response to the query request.

In another embodiment, a computer storage medium has computer readable instructions stored thereupon that, when executed by a computer, cause the computer to retrieve metadata from a local database associated with a query and identify a query tree data structure for the query using the metadata wherein the query tree data structure indicates a data source associated with the at least one sub-query. The instructions further cause the computer to identify a location type associated with the data source, wherein the location type indicates either a local source type or an external source type. The computer initiates a first sub-query to a local database for local data by requesting the local data from a query process layer in the local database if the location type is the local source type. If the location type is the external source type, the computer initiates a second sub-query to an external database for external data by requesting the external data from an internal query process layer module accessing the external database. Once either the local data from the local database or the external data from the external database is received, a query response data is provided based on processing the local data or the external data in response to the query.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
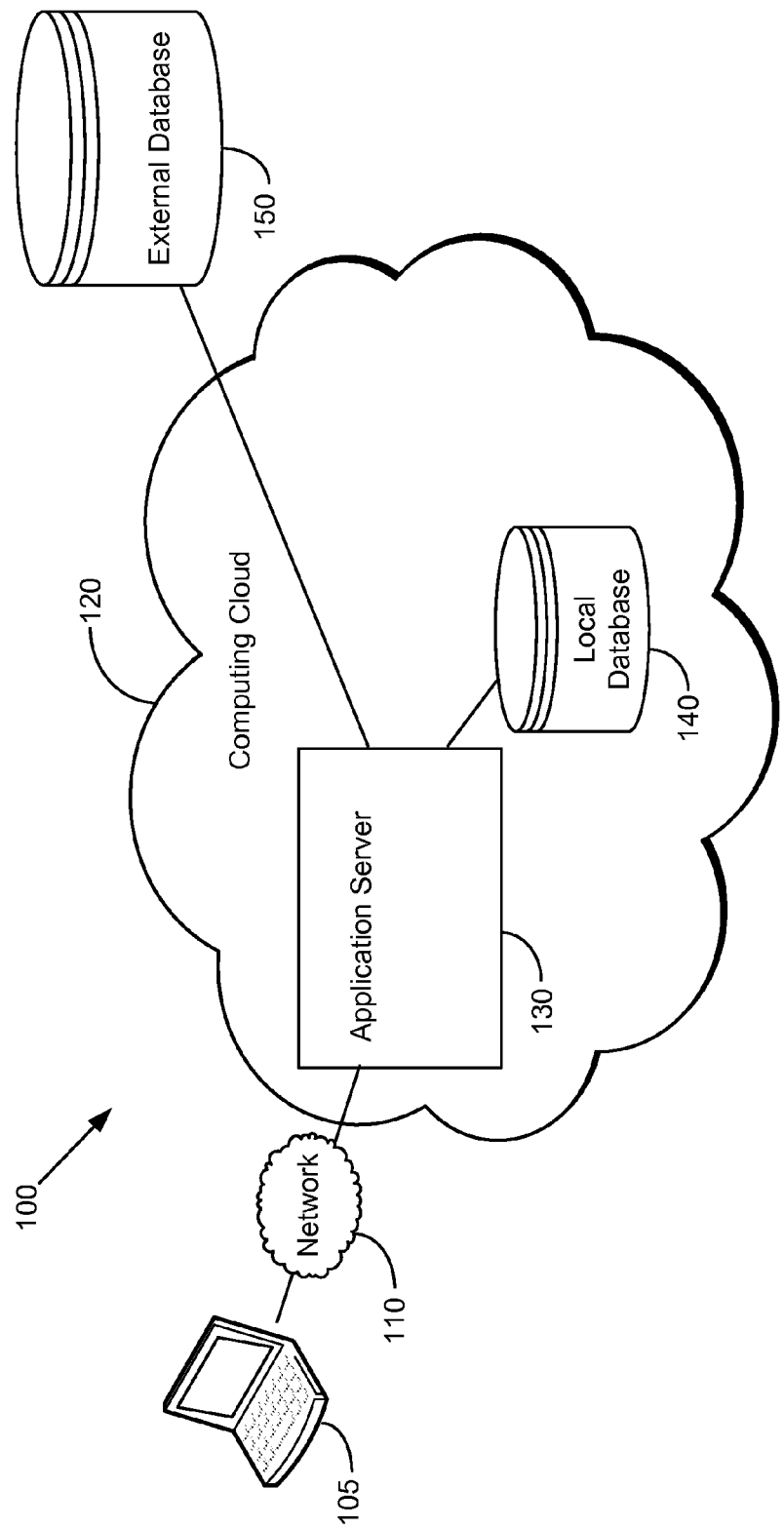
FIG. 1 is a schematic diagram of a system environment of one embodiment of the concepts and technologies disclosed herein.

The following detailed description is directed to a query processing system that optimizes the processing of a database query, which potentially may involve accessing local and/or external data to the system. In the following detailed description, references are made to the accompanying drawings that form a part hereof, and which are shown by way of illustration specific embodiments or examples. Referring now to the drawings, in which like numerals represent like elements throughout the several figures, aspects of a dynamic query processing system for external data connection from a cloud-based application server will be presented.

The maintenance of computer processing devices, particularly of databases, can consume significant resources for a user or enterprise. To operate effectively, a database requires periodic maintenance, including backup to anticipate possible outages, upgrades to software, and other and administration aspects. Thus, it is not unexpected that many users, including small business enterprises, rely on a third party service provider to store their data and perform such database maintenance activities. Numerous service providers are available that can provide, for example, hosting for data and server applications. For example, many enterprises rely on third party hosting providers to host their web sites.

Many users are also similarly finding advantages on relying on a service provider to host computer applications (programs), as opposed to executing the application on a local computer system. This also relieves the user of the responsibility of various maintenance aspects associated with the computer application. Many users are now relying on so-called, cloud computing services for running their applications and storing their data. "Cloud computing" is named as such because the user is not aware of how or where data is stored, and views the service as a logical cloud providing the desired functionality.

Various types of applications may be hosted in a cloud computing environment, and many rely on a common capability of accessing data from various storage repositories or databases. Whether the application is a document management system or a database application per se, these applications often initiate a database query for accessing data to complete a given task. For sake of illustration, the examples disclosed herein refer to the cloud based application accessed by a user as an application, which could be used for various purposes. The application may be a database application per se, or it may be another type of application.

The application may access data that is local to the application platform, as well as data that is external to the application platform. The exact scope of the distinction between "local data" from "external data" is not always clear or precise. Typically, a system platform whether it be a server, set of servers, or a server farm may be designated as being part of the local environment, whereas a platform that is remote, or is not operated by the same service provider may be considered as external. Usually, the external data resides on a hardware system that is not considered to be the same hardware system that stores the local data. The distinction between local data and remote data may be somewhat amorphous. For the sake of illustration, the external data for the examples disclosed herein are presumed to be stored on another server accessible via a network of some type. In many embodiments, the external data is data on a server that is not controlled or operated by the same service provider that is providing the hosted application.

A context of the role of the cloud service provider in one embodiment is shown in FIG. 1. The context comprises a system 100 that includes a user 105, depicted in the form of a laptop, although any form of conventional processing device can be used, such as a tablet, desktop, smartphone, etc. The access from a user device to the network may be wired (as shown), or wireless (not shown). The user typically accesses the computing cloud 120 by using a network 110, typically the Internet, although any LAN, WAN, or enterprise network could be used. The user typically is not readily aware of the particular computing cloud 120 configuration providing applications and data stored therein, which in this embodiment involves an application server 130 as shown. The application executing in the application server can be itself directed to a document handling system, spreadsheet, slide presentation program, web server, etc. The application incorporates or utilizes generation of database queries in order to provide the necessary functionality.

The application server 130 itself can be of a variety of types, including a single processing server, a multiple processor server, a blade server, or a distributed processing server. Various types of operating systems could be used. The type of processor and operating system used does not impact the concepts and technologies presented herein.

The application server 130 can access data from a variety of sources, although only two sources are shown in FIG. 1. Regardless of the number of sources, the data sources can be categorized into one of two types, a local database 140 storing what is referred to herein as local data and an external database 150 storing what is referred to herein as external data. For purposes herein, a database can be equated to a data repository. The connectivity between the application server 130 and the local database 140 may be via a local area network ("LAN") or other type of network, whereas the access to the external database 150 may involve using a wide area network ("WAN") or other network, such as the Internet.

When the application server 130 requires data for accomplishing a desired service, it will initiate a query to the appropriate data repository. The application server 130 may access data from only the local database 140, from the external database 150, or data from both the local database 140 and the external database 150.

Figure 2:
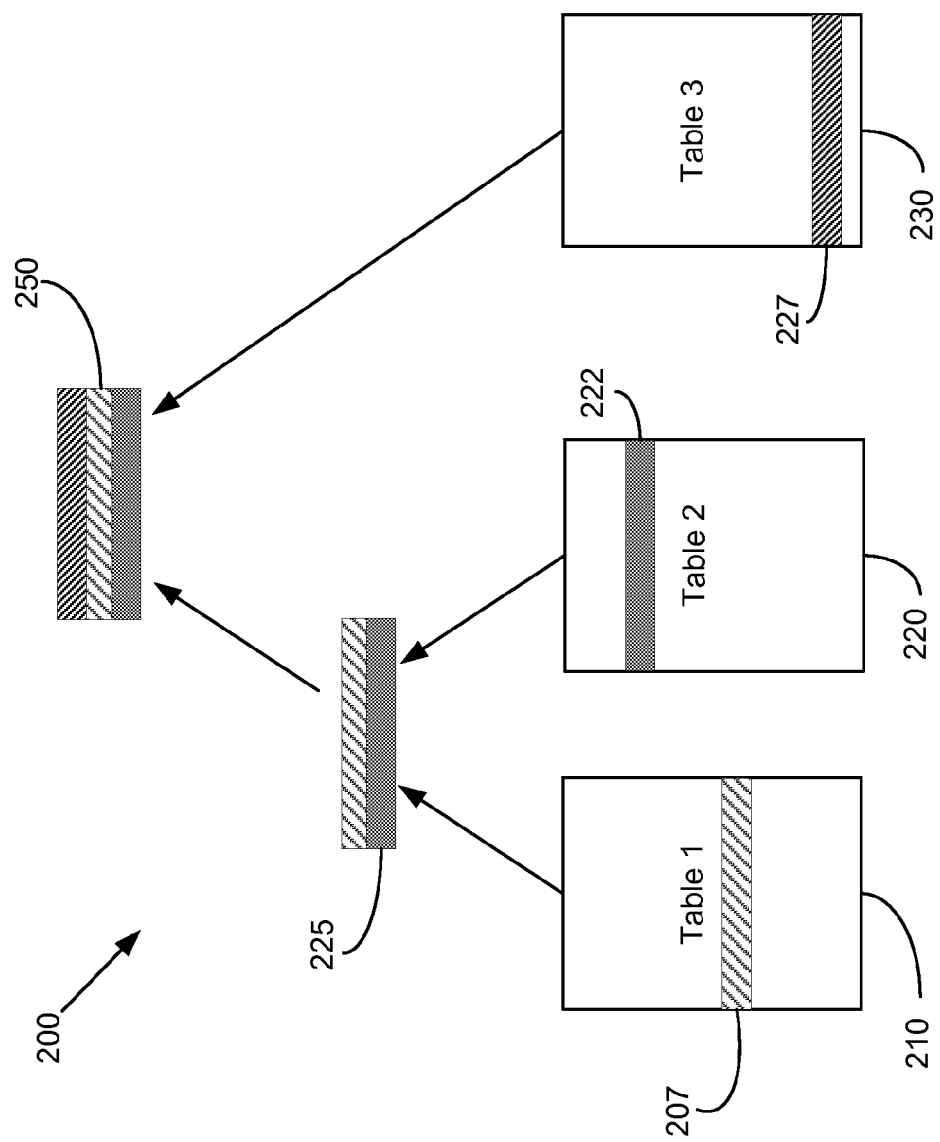
FIG. 2 is a schematic diagram showing different types of data sources that are used in processing a query as disclosed herein according to one embodiment.

When the application server 130 generates a query to access data, the application server may access data from several data sources. One embodiment of this is illustrated in FIG. 2. FIG. 2 illustrates a graphical representation 200 of the data sources that may be accessed to fulfill a query request. In FIG. 2, there are three data sources 210, 220, and 230. For the sake of illustration, each data source is shown as a table, although other types of data structures can be used in other embodiments. The particular query being fulfilled is not particularly relevant, but for sake of illustration assume that Table 1 210 comprises a list of employees and their current residential addresses. Table 2 220 comprises a list of employees, their job function, and organization in the enterprise. Table 3 230 comprises a database of commercial driver licensees in various states.

The database query may involve determining whether any employees in a certain organization, such as in a warehousing operation of a company division, are able to drive a truck for their employer. The ability to drive a truck would be evidenced by having an issued commercial driver license. The process may involve first identifying employees in that specified warehousing organization. This group of employees may be represented by the subset of data 222 depicted in Table 2 220. The identification of employees may further be limited by only selecting those employees having a certain pay-grade or authority level. For the sake of illustration, assume that three individuals are identified.

Next, data 207 from Table 1 210 is retrieved that only obtains the names and addresses of those three employees in the data 222 identified from the search of Table 2. This information can be joined such that the dataset 225 comprises the names, addresses, and organizational information of the three employees.

The query processing is not completed, because the query also involves determining whether any of these three employees have a commercial driver license. This information may be available in Table 3. In order to verify that the individuals have a driver's license, it may be necessary to compare the person's name and address in Table 3 with the name and addresses of the employees. Merely checking only the names of the three individual may be insufficient, since many names are common and can be duplicative in a large population. In this case, assume that only two of the three individuals are listed in the commercial driver license database. The data 227 of these two individuals are retrieved from Table 3 230, and that resulting information derived from data sets 207, 222, and 227 are shown in dataset 250. In summary, the resulting data set may have the names and organizational information of the two individuals in the warehousing division that have been issued commercial driver licenses.

Although the example above shows that three data sources are used, it is possible that a fourth table (or more) may be accessed. For example, a fourth table could list traffic convictions based on public records. The fourth table may be accessed to determine whether any of the two eligible employees have a record of prior traffic violations. The above illustration is designed to show that a query may involve accessing different types of information from different sources.

The above example also illustrates that how the query is processed can reduce the processing involved. For example, the above example illustrates that the search of Table 2 was performed first to identify eligible employees in a certain division of a certain pay-grade, which returned the names of three individuals. Next, these three names were used to access address information which is a fairly limited search of Table 1. Next, these three names were searched in Table 3, which yielded only two results.

However, a different processing methodology may require more computation resources. For example, the processing may first identify all individuals having a commercial driver's license. This would essentially return the entire Table 3 dataset to the application server. Then, that dataset could be searched to determine which names are in common with the employees of Table 2. Then, the addresses of the individuals could be obtained from Table 1 and compared with the address information from Table 3. While the same result can be obtained, it may require more processing of data.

In the above example, the locations of the databases storing the data in Table 1, Table 2, and Table 3 were not indicated. In the above example, the names and address information in Table 1 and the names and organizational information in Table 2 may be data stored by a human resources ("HR") organization of an enterprise. This data may be stored in a data repository associated with the HR organization. If the HR organization has an application running in a cloud computing environment, this data could be viewed as local by the application, and could be stored in one local database or two local databases.

However, it may be unlikely that the HR organization would keep a comprehensive database of commercial driver licensees. This may be maintained, by a state or federal licensing agency. In this case, the data from Table 3 may be external to the computing cloud and the application server. This data could be stored on one or more external databases, although it can still be access by the application.

Figure 3:
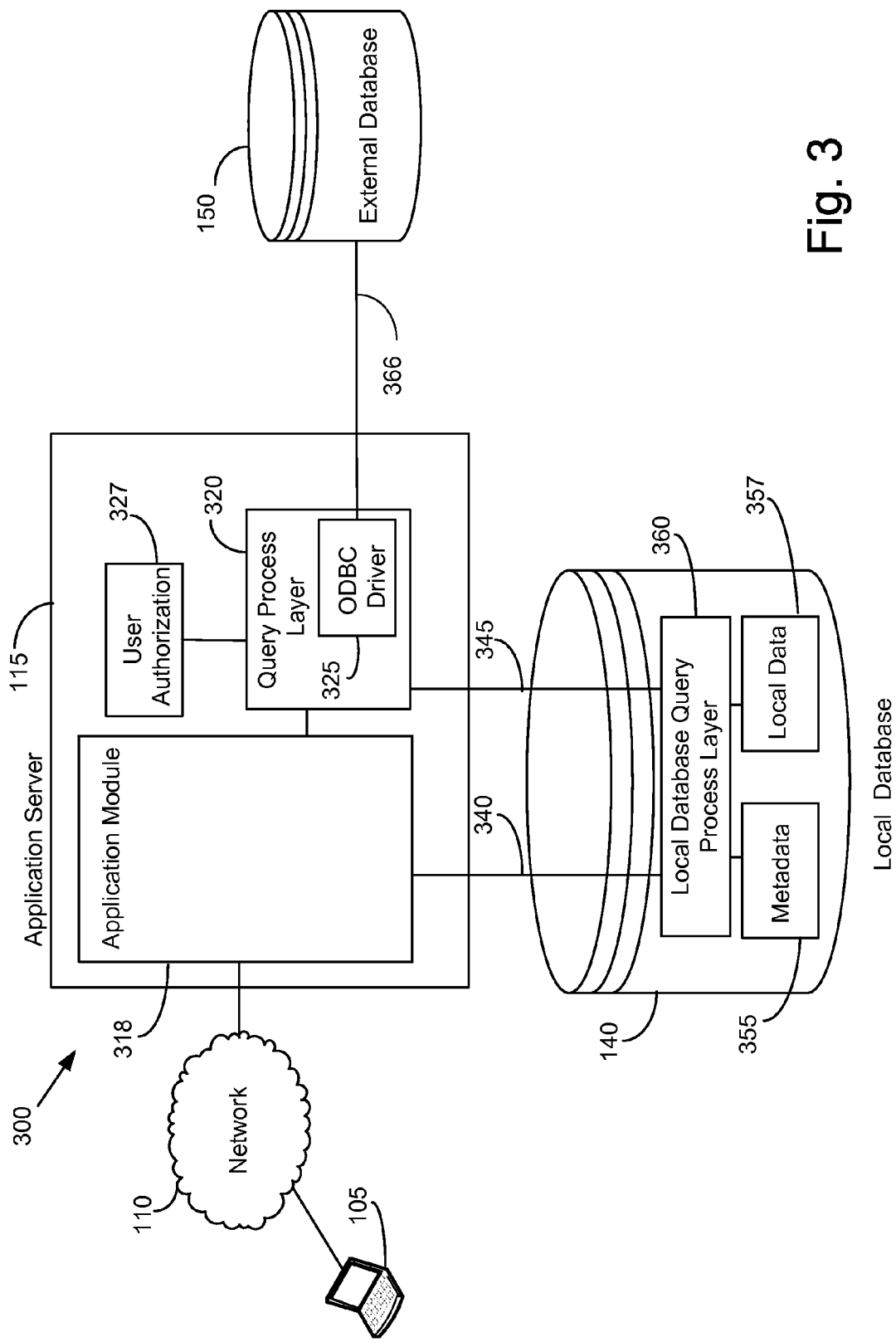
FIG. 3 is a schematic diagram showing an architecture of a system for processing a query as disclosed herein according to one embodiment.

One embodiment of the system for processing the queries is shown in FIG. 3. FIG. 3 shows the system 300 comprising the application server 115 able to communicate with the external database 150 and the local database 140. Although a single local database and a single external database are illustrated, in other embodiments there may be a plurality of local and/or external databases. The application server 115 executes an application module 318 (or simply "application") for whatever purpose it is designed to perform, and it is the application that generates the initial request for data that is provided by the local and/or external database.

In one embodiment, the external database 150 provides data to the application server 115 as requested by the query process layer 320. The request via an open database connection ("ODBC") module 325 is a standard mechanism for accessing a third party database. The ODBC module 325 is invoked by the query process layer module 320, which in turn is invoked by the application module 318. The external database may be a SQL based database or some other type of database. As long as the appropriate driver (in this case, the ODBC module 325) is present, a variety of external databases may be used and the software structure of the external database 150 is not relevant. Thus, the query process layer 320 may invoke other database drivers for communicating with other databases.

The application module 318 may interact with a user authorization module 327 that maintains information about user permissions. User permissions are used to ensure the user 105 is authorized to access the application module 318, and to ensure that the data provided by the accessed databases is authorized, to be provided to the user. This will be discussed further below.

The local database 140 stores metadata 355 and the local data 357, which are accessed via a local database query process layer 360. The local database query layer 360 may receive a request either from the application module 318 as denoted by line 340, or receive a request from the query process layer 320 denoted by line 345, as will be discussed further.

The metadata 355 comprises data which describes the nature of the query, including the various sources of the data required to fulfill the request, along with an indication of the location type of the data source; namely whether the data source is of a local type or an external type. The metadata 335 may also include an address of the data source. However, merely knowing the address of the data source may not be sufficient to indicate whether the data is considered local or external.

The metadata is used by the application module 318 to create a tree-like data structure that is used to determine the order in which the data sources are accessed and the nature of the data required in fulfilling the query, specifically whether the data is local or external. This data structure is called a "query tree."

Figure 4:
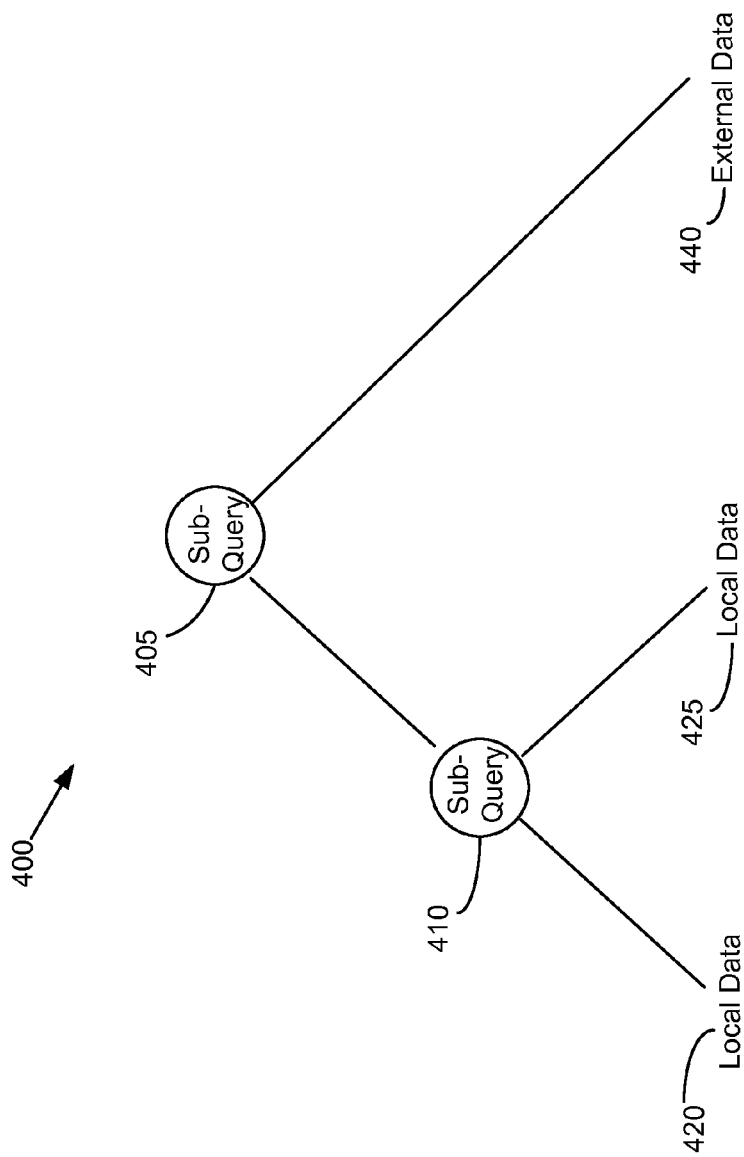
FIG. 4 is a illustrative diagram of a tree structure of metadata used in processing the query as disclosed herein according to one embodiment.

An exemplary data structure for a query tree constructed by the application module 318 using the metadata 355 is shown in FIG. 4, FIG. 4 illustrates a query tree 400 having two nodes 410 405, each of which indicates a sub-query must be performed. A sub-query is merely a query which is used in the process of fulfilling the original query. The sub-query 405 which is at the top of the query tree would result in providing the results for fulfilling the original query, but it is still referred to as a sub-query. Note that if the query tree data structure comprises only single sub-query, then the distinction between a sub-query and a query is blurred.

The query tree 400 can be described as a roadmap for how the query has to be broken down into sub-queries and performed, as well as where the data sources can be found and the corresponding location type (local or external). The application module uses this information to determine dynamically which query layer service should be used to most effectively process the query.

This illustration of FIG. 4 represents the query tree for the previous example provided for FIG. 2. The query tree can be described as comprising nodes 410, 405 and leaves 420, 425, and 440. Each node can be thought of as representing a sub-query that is required to be performed to fulfill the original query, and the leaves include information regarding the various data sources required to be accessed. The hierarchical relationship of the nodes indicates a relative order that each corresponding sub-query must be performed. Information in the leaves indicates whether the data source is local or external.

Thus, the local data 420 of FIG. 4 can correspond to data found in Table 1 210 of FIG. 2. The local data 425 can correspond to the data found in Table 2 220, and the external data 440 can correspond to the data in Table 3 230. The lowest level sub-queries in the query tree data structure are performed first. If there are multiple lowest level sub-queries (which are not shown in FIG. 4), then these sub-queries can be performed in parallel. The lowest sub-query 410 is performed before the higher sub-query 406. The application module performs the sub-query by initiating a request to the local database 140. These results are then used in completing the higher up sub-query 405.

In the case of the lower level sub-query 410, because the data is local, the application module uses the services of the local database query process layer 360 to retrieve the necessary data. In this embodiment, the local data is found in Table 1 210 and Table 2 220, both of which are stored in the local database 140. Because the local database 140 stores all the data necessary to complete the query, and it is more effective to let the local database 140 process this portion of the query tree by utilizing a query processing layer 360 in the local database 140.

Turning now to the higher layer sub-query 405, the application module has now received the results of the lower sub-query 410, and may store the results in memory while it queries the external database 440 for the required external data. In this case, the application module 318 uses the services of an internal query process layer 320 to retrieve the external data 440 from the external database.

The external data may be retrieved by the query process layer 320 using the services of the aforementioned ODBC driver 325 to access the external database 150. When the external data is received from the external database, it is passed from the ODBC to the query process layer 320, which processes the external data as appropriate with the results from the local database 140 produced by the lower sub-query 410. The results from sub-query 405 are then passed to the application module in response to the original query request.

In the above example, it is presumed that the user on whose behalf the query is being performed is authorized to retrieve the queried data from the local and/or external data sources. In many cases, the user may be limited or otherwise restricted with respect to what data they can access. Information used to determine what data the user can query is found in the user authorization data.

The user authorization 327 contains data that can be used for two different, but related purposes. The user authorization data may be used by the application module 318 to ensure that the user 105 is authorized to use the application, and then to identify the types of data that the user can access. Thus, the user authorization data can be used in conjunction with processing a query to ensure that the user can be provided with the requested data and that the user is authorized to see that data.

For example, the aforementioned query example of accessing HR records for employees may be restricted to only employees in the HR organization. The user authorization information may prohibit certain employees (e.g., non HR employees) from accessing the application module, or the user authorization information may prohibit certain data from being returned to the user. Prohibiting data from being queries can occur at different locations within the context of FIG. 3. The user authorization information may be used by the query processing layer 320 to restrict a query, or restrict which results should be returned. In other embodiments, the user authorization information may be passed to the local database query process layer, where it uses the information to determine which information can be provided to the application module. Similarly, the user authorization can be provided to an external database to determine which information can be returned. In other embodiments, the external database may maintain users permissions.

To elaborate further, in one embodiment, the query process layer 320 accesses the user authorization information 327 to determine what data that is returned from the external database 150 can be provided back to the application module 318. In another embodiment, the application module 318 accesses the user authorization information 327 to determine what data can be returned in response to the original query.

Figure 5:
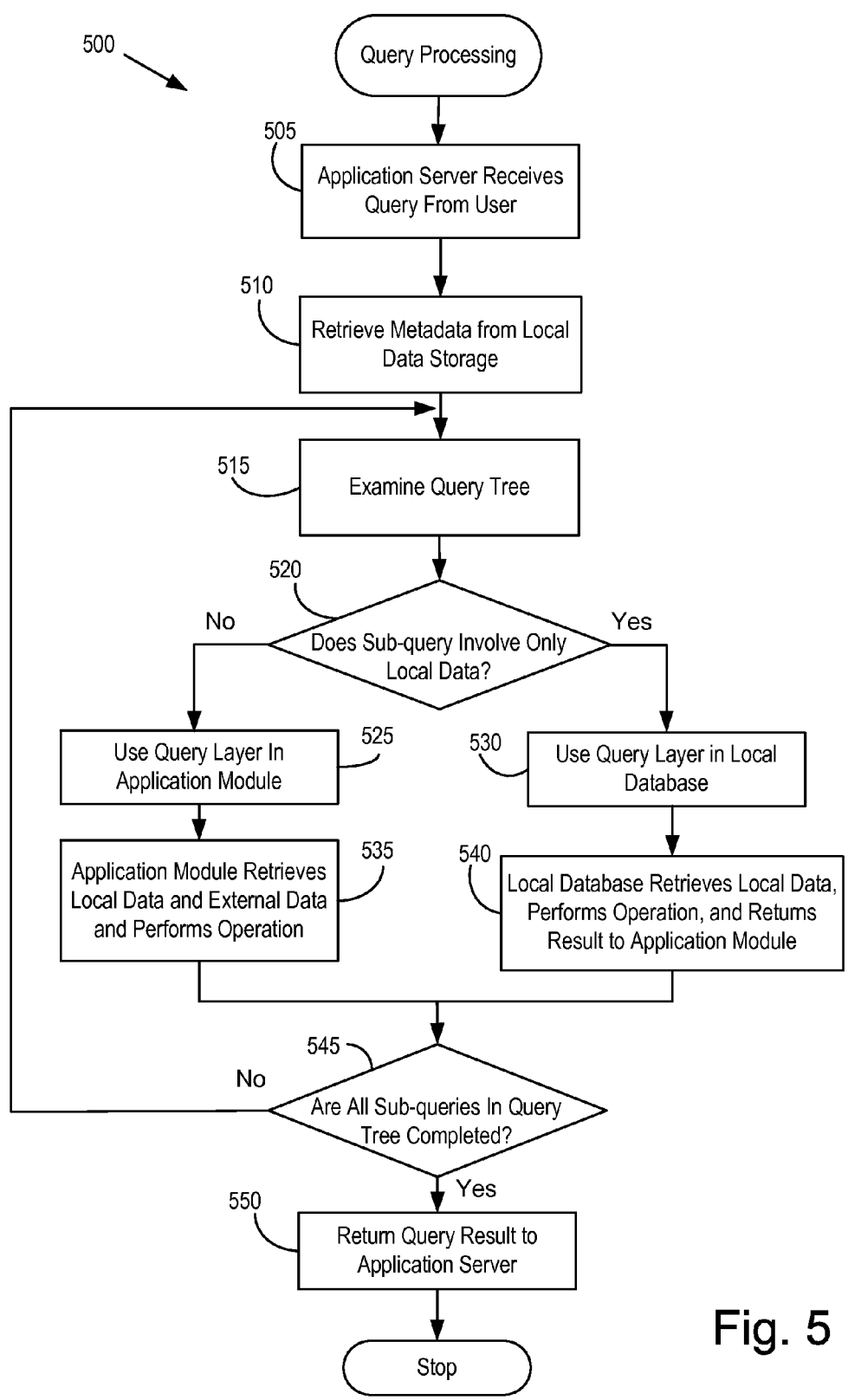
FIG. 5 is a schematic diagram illustrating a process flow for processing a query as disclosed herein according to one embodiment.

One embodiment of the method for processing of a query generated by the application module 318 is shown in FIG. 5. It should be appreciated that the logical operations described herein with respect to FIG. 5 and the other figures are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in a different order than those described herein.

Returning to FIG. 5, the process 500 begins in operation 505 with the application module 318 receiving a query request from a user. In other embodiments, the user may have requested an action to be performed that causes the application module 318 to generate the query, or the application module 318 may have generated the query on its own determination.

The next operation 510 involves the application module 318 retrieving metadata 355 from the local database 140. The application module 318 sends a request to the local database query process layer 360, which fulfills the request by accessing the metadata 355. A query tree, such as illustrated in FIG. 4, is used to determine the order of sub-queries and the sources of data required to fulfill the query. Once the metadata is retrieved, then in operation 515 the application module 318 generates and examines the query tree to ascertain which sub-queries are required to be performed initially, and whether the data is to be found in the local database 140 or the external database 150, or both. The information regarding the location type (local or external) as well as the location of the required data can be found in the leaf of the tree, e.g., see 420, 424, 440 of FIG. 4.

In operation 520, a determination is made for each sub-query node in the query tree as to whether the leaf involves only local data or involves external data. Thus, this process will reiterate until all sub-query nodes in the query tree are processed. In operation 520, if the sub-query involves local data only, i.e., data stored in the local database, then the application module 318 uses the query layer in the local database 140 as indicated in operation 530. In operation 540 the local database then retrieves the data necessary using a query processing layer in the local database, performs the necessary operations, and returns the result of the sub-query to the application module 318.

If, however, in operation 520 it is determined from the query tree that external data is required to fulfill the sub-query, then the query layer 320 in the application module is used as indicated in operation 525. Assume in this example, that some data may be locally stored in the local database 140. The query process layer 320 will retrieve the required local data from the local database. In other embodiments, the application module 318 may have the data for one of the nodes already stored in memory as a result of a prior sub-query operation.

In operation 535, the query process layer 320 in the application module then retrieves the local and external data from the appropriate databases. In accessing local data, the local database query processing layer 360 is relied upon. In accessing external data, various drivers or interface modules may be used to access the appropriate external database. For example, in FIG. 3, the query process layer may use the ODBC driver 325 to access the external database 150. In other embodiments, different database drivers may be used depending on the external database accessed. Once the external data is received, the query process layer completes the processing associated with the external data. Note that this may involve processing the external data in conjunction with the previous acquired local data.

In operation 545, a determination is made whether all the sub-queries associated with a query tree have been completed. As illustrated in prior examples, a query may have various sub-queries, which may be performed in a hierarchical manner in order to complete the overall query. If further sub-queries remain to be performed, then the process loops back to operation 515, where remaining nodes are examined. If in operation 545, there are no further sub-queries, then operation 550 has been completed, and the query result can be provided to the application module 318.

Figure 6:
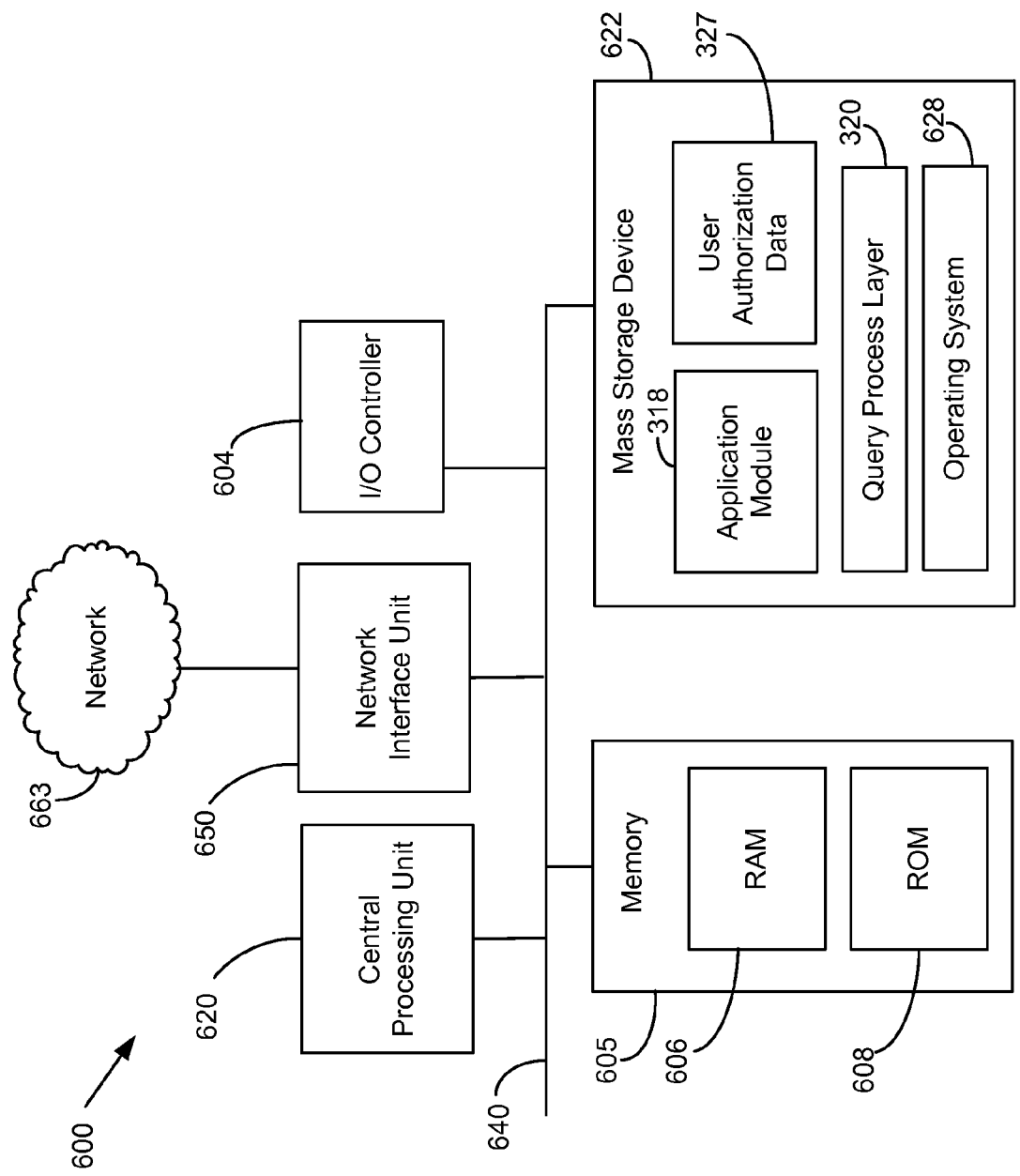
FIG. 6 is a schematic diagram of a computing architecture for performing the query processing as disclosed herein according to one embodiment.

One embodiment for the application server 130 that can perform the above identified processes is shown in FIG. 6. FIG. 6 shows an illustrative computing architecture 600 for the application server 600 capable of executing the software components described herein for processing queries from a user. The computer architecture shown in FIG. 6 illustrates a conventional server computer and may be utilized to execute any aspects of the software components presented herein. Other architectures or computers may be used to execute the software components presented herein.

The computer architecture shown in FIG. 6 includes a central processing unit 620 ("CPU"), a system memory 605, including a random access memory 606 ("RAM") and a read-only memory ("ROM") 608, and a system bus 640 that couples the memory to the CPU 620. A basic input/output system containing the basic routines that help to transfer information between elements within the clearinghouse server 600, such as during startup, is stored in the ROM 608. The computer 600 further includes a mass storage device 622 for storing an operating system 628, application module 318, and other modules, as described herein.

The mass storage device 622 is connected to the CPU 620 through a mass storage controller (not shown), which in turn is connected to the bus 640. The mass storage device 622 and its associated computer-readable media provide non-volatile storage for the computer 600. Although the description of computer-readable media contained herein refers to a mass storage device, such as a hard disk or CD-ROM drive, it should be appreciated by those skilled in the art that computer-readable media can be any available computer storage media that can be accessed by the computer 600.

By way of example, and not limitation, computer-readable media may include volatile and non-volatile, removable and non-removable media implemented in any method or technology for storage of information such as computer-readable instructions, data structures, program modules or other data. For example, computer-readable media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer 600.

According to various embodiments, the computer 600 may operate in a networked environment using logical connections to remote computers or databases through a network such as the network 653. The computer 600 may connect to the network 653 through a network interface unit 650 connected to the bus 640. It should be appreciated that the network interface unit 650 may also be utilized to connect to other types of networks and remote computer systems. The computer 600 may also include an input/output controller 604 for receiving and processing input from a number of other devices, including a keyboard, mouse, or electronic stylus (not shown in FIG. 6). Similarly, an input/output controller may provide output to a display screen, a printer, or other type of output device (also not shown in FIG. 6).

As mentioned briefly above, a number of program modules and data files may be stored in the mass storage device 622 and RAM 606 of the computer 600, including an operating system 628 suitable for controlling the operation of a networked desktop, laptop, or server computer. The mass storage device 622 and RAM 606 may also store one or more program modules or data files. In particular, the mass storage device 622 and the RAM 606 may store the application module 318, and the user authorization data 327, described in detail above. The mass storage device 622 and the RAM 606 may also store the query process layer 320 that is used when accessing external data sources. In addition, external database drivers may be stored as well. Other types of applications and data may be stored as needed.

It should be appreciated that the software components described herein may, when loaded, into the CPU 620 and executed, transform the CPU 620 and the overall computer 600 from a general-purpose computing system into a special-purpose computing system customized to facilitate the functionality presented herein. The CPU 620 may be constructed from any number of transistors or other discrete circuit elements, which may individually or collectively assume any number of states. More specifically, the CPU 620 may operate as a finite-state machine, in response to executable instructions contained within the software modules disclosed herein. These computer-executable instructions may transform the CPU 620 by specifying how the CPU 620 transitions between states, thereby transforming the transistors or other discrete hardware elements constituting the CPU 620.

Encoding the software modules presented herein may also transform the physical structure of the computer-readable media presented herein. The specific transformation of physical structure may depend on various factors, in different implementations of this description. Examples of such factors may include, but are not limited to: the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software may also transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations may also include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer 600 in order to store and execute the software components presented herein. It also should be appreciated that the computer 600 may comprise other types of computing devices, including hand-held computers, embedded computer systems, personal digital assistants, and other types of computing devices known to those skilled in the art. It is also contemplated that the computer 600 may not include all of the components shown in FIG. 6, may include other components that are not explicitly shown in FIG. 6, or may utilize an architecture completely different than that shown in FIG. 6.

Based on the foregoing, it should be appreciated that an application module can retrieve metadata associated with a query, and examine the query to dynamically determine whether the services of a query process layer in a local database should be used, or whether a query process layer internal to the application module should be used. It should also be appreciated that the subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A system for processing a query request, comprising:
    a local database storing metadata and local data, wherein the local database stores a local database query processing layer configured to process a local sub-query to a local database;
    an external database storing external data and configured to return external data in response to an external sub-query to an external database;
    a memory configured to store the metadata retrieved from the local database; and
    an application server comprising a processor, wherein the processor is configured to fulfill the query request by
    retrieving the metadata stored in the local database,
    ascertaining at least one sub-query associated with a first data source location type,
    initiating the at least one sub-query comprising a local query request to the local database in response to ascertaining that the first data source location type is a local data type,
    initiating the at least one sub-query comprising the external query request to the external database in response to ascertaining that the first data source location type is an external data type, and
    analyzing a query tree data structure comprising one or more nodes representing one or more sub-queries required to be performed in order to generate a query result.

2. The system of claim 1 wherein the processor is further configured to determine that a sub-query associated with each respective one or more nodes in the query tree has been initiated.

3. The system of claim 1, wherein each leaf in the query tree data structure indicates a respective data source associated with either the local data type or the external data type.

4. The system of claim 1, wherein the processor is configured to initiate a first sub-query to the local data database and a second sub-query to the external database, wherein the first sub-query retrieves local data and the second sub-query retrieves external data.

5. The system of claim 4, wherein the memory stores authorization data used to ascertain that the local data or the external data can be provided to an application module in the query response.

6. A method for processing a query request, comprising
    generating a query request at an application module in an application server;
    retrieving metadata from a local data store, wherein the metadata is associated with the query request;
    analyzing the metadata to derive a query tree data structure from the metadata to identify a first sub-query to be performed to fulfill the query request, wherein the first sub-query is directed to an external database, wherein the query tree data structure identifies a second sub-query directed to a local database required to be performed to fulfill the query request, wherein the second sub-query in the query tree data structure is associated with a second data source location type indicating a local data type, and wherein the query tree data structure comprising one or more nodes representing one or more sub-queries required to be performed;

determining from the query tree data structure a first data source location type indicating an external data type;

initiating the first sub-query request to a query processing layer in the application module to retrieve the external data;

initiating the second sub-query request to a second query processing layer in the local database;

receiving local data from the local data store in response to the second sub-query;

processing the external data and the local data to formulate a query results; and returning the query result in response to the query request.

7. The method of claim 6, wherein the query processing layer in the application module further provides the second sub-query to an external database interface module in the application module.

8. The method of claim 7, wherein the external database interface module comprises an open database connection ("ODBC") module.

9. The method of claim 7, further comprising:

accessing user authorization information stored in the application server; and using the user authorization information to process the external data and the local data to determine data provided in the query result.

10. The method of claim 6, wherein the second query processing layer in the local database is used to retrieve the metadata.

11. The method of claim 6, wherein the query tree data structure also identifies a third sub-query required to be performed to fulfill the query request, and the query tree data structure defines an order for performing the third sub-query relative to the first sub-query and the second sub-query.

12. The method of claim 11, wherein the query tree data structure indicates a plurality of data sources each with a corresponding data source location type.

13. A solid state storage device, an optical disk or a magnetic storage device, having computer readable instructions stored thereupon that, when executed by a computer, cause the computer to:

retrieve metadata from a local database associated with a query;

identify a query tree data structure for the query using the metadata wherein the query tree data structure indicates a data source associated with the at least one sub-query, and wherein the query tree data structure comprises one or more nodes representing one or more sub-queries required to be performed;

identify a location type associated with the data source, wherein the location type indicates either a local source type or an external source type;

initiate a first sub-query to a local database for local data by requesting the local data from a query process layer in the local database in response to identify-ing the location type is the local source type;

initiate a second sub-query to an external database for external data by requesting the external data from an internal query process layer module accessing the external database in response to identifying the location type is the external source type;

receive either the local data from the local database or the external data from the external database;

analyze the query tree data structure to generate query response data; and provide the query response data based on processing the local data or the external data in response to the query.

14. The solid state device, optical disk, or magnetic storage device of claim 13, wherein the query tree data structure comprises a plurality of data sources wherein a first data source has a corresponding data source location type indicating the local source type and a second data source has a corresponding data location type indicating the external source type.

15. The solid state device, optical disk, or magnetic storage device of claim 14, wherein the instructions when executed by a computer, further cause the computer to:

analyze the query tree data structure to determine an order of performing the first sub-query and the second sub-query, wherein the first sub-query retrieves data from the local data base and the second sub-query retrieves data from the external database.

16. The solid state device, optical disk, or magnetic storage device of claim 15, wherein the instructions when executed by a computer, further cause the computer to:

transmit the first sub-query to the query process layer in the local database.

17. The solid state device, optical disk, or magnetic storage device of claim 14, wherein the instructions further cause the computer to convert the second request to the external database by the internal query process layer module using an external database interface module.

18. The solid state device, optical disk, or magnetic storage device of claim 13, wherein either the first request or the second request are processed using user authorization data to ascertain that the data can be provided in the response to the query.

* * * * *